C. R. PATTERSON.
Horse-Rake.
No. 215,068. Patented May 6, 1879.
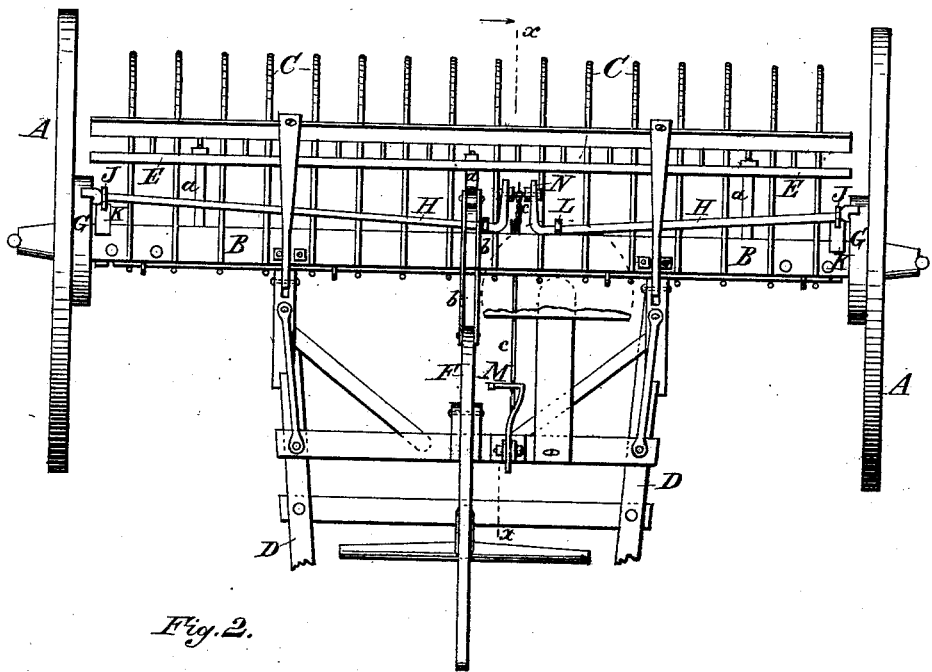
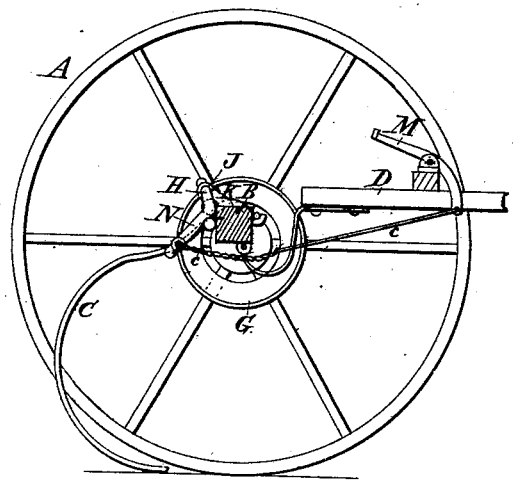
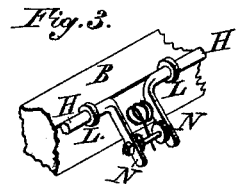
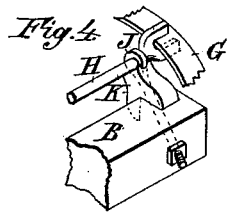
Attest:
F. H. Schott
H. P. Sanders
Inventor:
C. R. Patterson

UNITED STATES PATENT OFFICE.

CHESTER R. PATTERSON, OF PITTSTON, PENNSYLVANIA.

IMPROVEMENT IN HORSE-RAKES.

Specification forming part of Letters Patent No. 215,068, dated May 6, 1879; application filed April 3, 1879.

*To all whom it may concern:*

Be it known that I, CHESTER R. PATTERSON, of Pittston, Luzerne county, in the State of Pennsylvania, have invented a certain new and useful Improvement in Horse-Rakes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a plan of the horse-rake. Fig. 2 is a cross-section. Figs. 3 and 4 are detail views.

My improvement relates to that class of horse-rakes known as "friction dumping-rakes;" and it consists in the arrangement of the clutch-rods upon the rear of the axle or rake-head, with the cranks projecting down behind the axle or rake-head, so as to throw the strain in lifting directly upon the axle, and prevent so great a strain being thrown upon the clutch-rods as to cause them to spring or become deranged, the cranks bringing up against the axle before the strain becomes so great as to damage the rods.

In the drawings, A A represent the wheels; B, the axle; C C, the teeth, attached to the axle. D D are the thills; E, the rider-bar or presser-bar, and is attached to the axle by studs as they are usually made.

A hand-lever, F, pivoted to a cross-bar of the thills, is connected with the center stud, a, between the axle and rider-bar E, by means of the bars b b, so that the axle may be turned and the teeth raised to dump the load by moving said lever, all of which are well known.

G G are rims bolted to the wheels. H H are two rods with slotted heads, which engage with the rims G G, and cranks N N, turning down directly behind the axle, as shown in Fig. 3, the outer ends of which are supported by struts K K, and secured by eyebolts J J, passing through the struts K K and fastened to the axle B, and at the inner end by ordinary eyebolts L L, passing through the axle B. The rod and chain c connect the cranks N N with the foot-lever M.

I claim—

The combination of the rims G G, slotted clutch-rods H H, foot-lever M, rod or chain c, with the cranks N N turned down directly behind the axle, as shown and described, and for the purpose set forth.

In testimony that I claim the foregoing I have hereunto set my hand and seal this 3d day of April, 1879.

CHESTER R. PATTERSON. [L. S.]

Witnesses:
  F. H. SCHOTT,
  FERD. SCHMIDT.